United States Patent
Ishii et al.

(10) Patent No.: US 8,036,110 B2
(45) Date of Patent: Oct. 11, 2011

(54) BASE STATION APPARATUS, USER EQUIPMENT, AND METHOD USED IN MOBILE COMMUNICATION SYSTEM

(75) Inventors: Hiroyuki Ishii, Yokosuka (JP); Atsushi Harada, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/532,111

(22) PCT Filed: Mar. 12, 2008

(86) PCT No.: PCT/JP2008/054512
§ 371 (c)(1),
(2), (4) Date: Feb. 5, 2010

(87) PCT Pub. No.: WO2008/114662
PCT Pub. Date: Sep. 25, 2008

(65) Prior Publication Data
US 2010/0177649 A1 Jul. 15, 2010

(30) Foreign Application Priority Data
Mar. 19, 2007 (JP) .................................. 2007-071588

(51) Int. Cl.
*G01R 31/08* (2006.01)
*H04W 4/00* (2009.01)
*H04L 1/18* (2006.01)

(52) U.S. Cl. ........ 370/229; 370/252; 370/328; 370/332; 714/748; 714/749

(58) Field of Classification Search .................. 370/252, 370/328, 229, 329, 332; 714/748, 749
See application file for complete search history.

(56) References Cited

U.S. PATENT DOCUMENTS

| | | | |
|---|---|---|---|
| 2006/0062173 A1* | 3/2006 | Cheng et al. .................. | 370/328 |
| 2006/0062217 A1* | 3/2006 | Kim et al. ...................... | 370/389 |
| 2006/0156184 A1* | 7/2006 | Kim et al. ...................... | 714/758 |
| 2007/0041349 A1* | 2/2007 | Kim et al. ...................... | 370/335 |
| 2008/0081651 A1 | 4/2008 | Kuroda et al. | |

FOREIGN PATENT DOCUMENTS

| | | |
|---|---|---|
| EP | 1 784 036 A1 | 5/2007 |
| JP | 09-312609 A | 12/1997 |
| WO | 2005/071874 A1 | 8/2005 |

(Continued)

OTHER PUBLICATIONS

Office Action for Japanese Application No. 2009-505153 mailed on Mar. 30, 2010 and English translation thereof, 5 pages.

(Continued)

*Primary Examiner* — Huy Vu
*Assistant Examiner* — Brandon Renner
(74) *Attorney, Agent, or Firm* — Osha • Liang LLP

(57) ABSTRACT

A base station apparatus communicating with a user equipment terminal in a mobile communication system is disclosed. The base station apparatus includes a determination unit determining whether an uplink signal received from the user equipment terminal is to be retransmitted, a control information generation unit generating control information to permit the user equipment terminal to transmit an uplink signal, and a transmission unit transmitting the control information to the user equipment terminal. Further, in the base station apparatus, when the determination unit determines that the uplink signal is to be retransmitted, the control information generation unit generates the control information so as to include retransmission information indicating that an uplink signal transmitted before from the user equipment terminal is to be retransmitted.

6 Claims, 12 Drawing Sheets

FOREIGN PATENT DOCUMENTS

| | | |
|---|---|---|
| WO | 2005/074184 A2 | 8/2005 |
| WO | 2006/016457 A1 | 2/2006 |

OTHER PUBLICATIONS

International Search Report for PCT/JP2008/054512 mailed Apr. 22, 2008 (7 pages).

Written Opinion of ISA for PCT/2008/054512 mailed Apr. 22, 2008 (3 pages).

3GPP TR 25.814 V7.0.0 (Jun. 2006) Technical Report 3rd Generation Partnership Project; Technical Specification Group Radio Access Network; "Physical Layer Aspects for Evolved Universal Terrestrial Radio Access (UTRA)" (Release 7) (126 pages).

3GPP TSG RAN WG Meeting #47bis; R1-070103 Sorrento, Italy, Jan. 15-19, 2007 NTT DoCoMo, et al. "Downlink L1/L2 Control Signaling Channel Structure: Coding" (17 pages).

3GPP TS 36.300 V0.3.1 (Nov. 2006) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN) Overall description; Stage 2 (Release 8) (64 pages).

3GPP TSG RAN WG1 #47bis; R1-070060 Sorrento, Italy, Jan. 15-19, 2007 Source: Motorola Title: QPP Interleaver Design for LTE (2 pages).

3GPP TS 25.321 V6.8.0 (Mar. 2006) Technical Specification 3rd Generation Partnership Project; Technical Specification Group Radio Access Network; "Medium Access Control (MAC) protocol specification" (Release 6) (91 pages).

Extended Search Report in European Application No. 08721928.3 mailed Mar. 4, 2011 (6 pages).

* cited by examiner

FIG.2

| BITS INDICATING DATA SIZE (6 BITS) | BITS INDICATING MODULATION SCHEME (2 BITS) | BITS INDICATING ALLOCATION INFORMATION OF RESOURCE BLOCKS (14 BITS) | BITS INDICATING INFORMATION OF TRANSMISSION POWER (5 BITS) | CRC BITS MASKED BY BITS INDICATING ID OF USER EQUIPMENT TERMINAL COMMUNICATING USING UPLINK SHARED CHANNEL (16 BITS) |

FIG.3

| BITS INDICATING DATA SIZE | DATA SIZE |
|---|---|
| 000000 | 3090 |
| 000001 | 3145 |
| 000010 | 3202 |
| 000011 | 3260 |
| .. | .. |
| 111100 | 9047 |
| 111101 | 9210 |
| 111110 | 9377 |
| 111111 | THIS VALUE INDICATES THAT "THIS UPLINK SCHEDULE GRANT IS NOT FOR NEW TRANSMISSION BUT FOR RETRANSMISSION" (THIS VALUE DOES NOT INDICATE DATA SIZE) |

FIG.4

| BITS INDICATING INFORMATION OF TRANSMISSION POWER | INFORMATION OF TRANSMISSION POWER (OFFSET VALUE WITH RESPECT TO SOUNDING REFERENCE SIGNAL) |
|---|---|
| 00000 | −6.0 dB |
| 00001 | −5.0 dB |
| 00010 | −4.0 dB |
| 00011 | −3.0 dB |
| ⋮ | ⋮ |
| 11100 | 22.0 dB |
| 11101 | 23.0 dB |
| 11110 | 24.0 dB |
| 11111 | 25.0 dB |

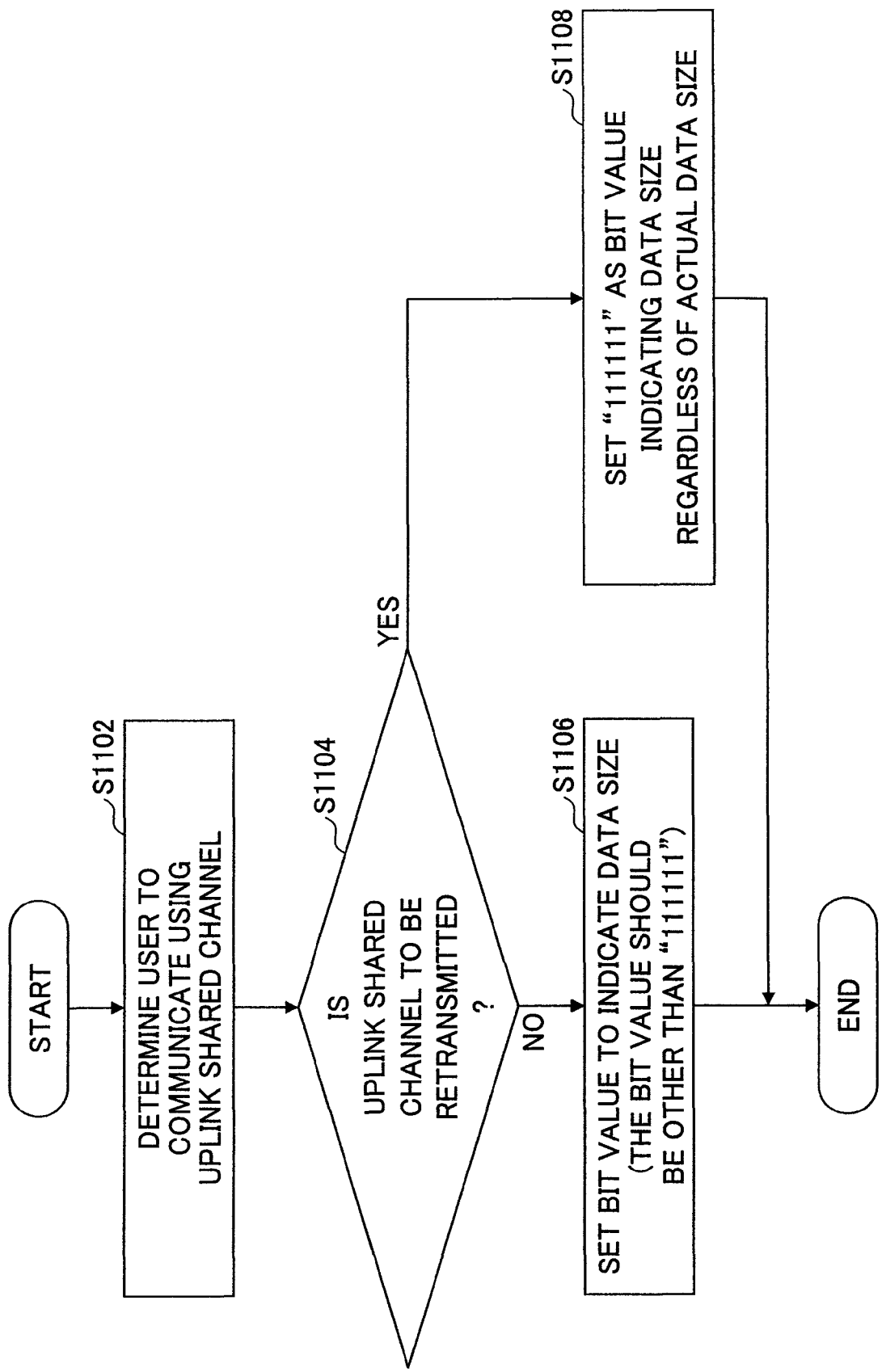

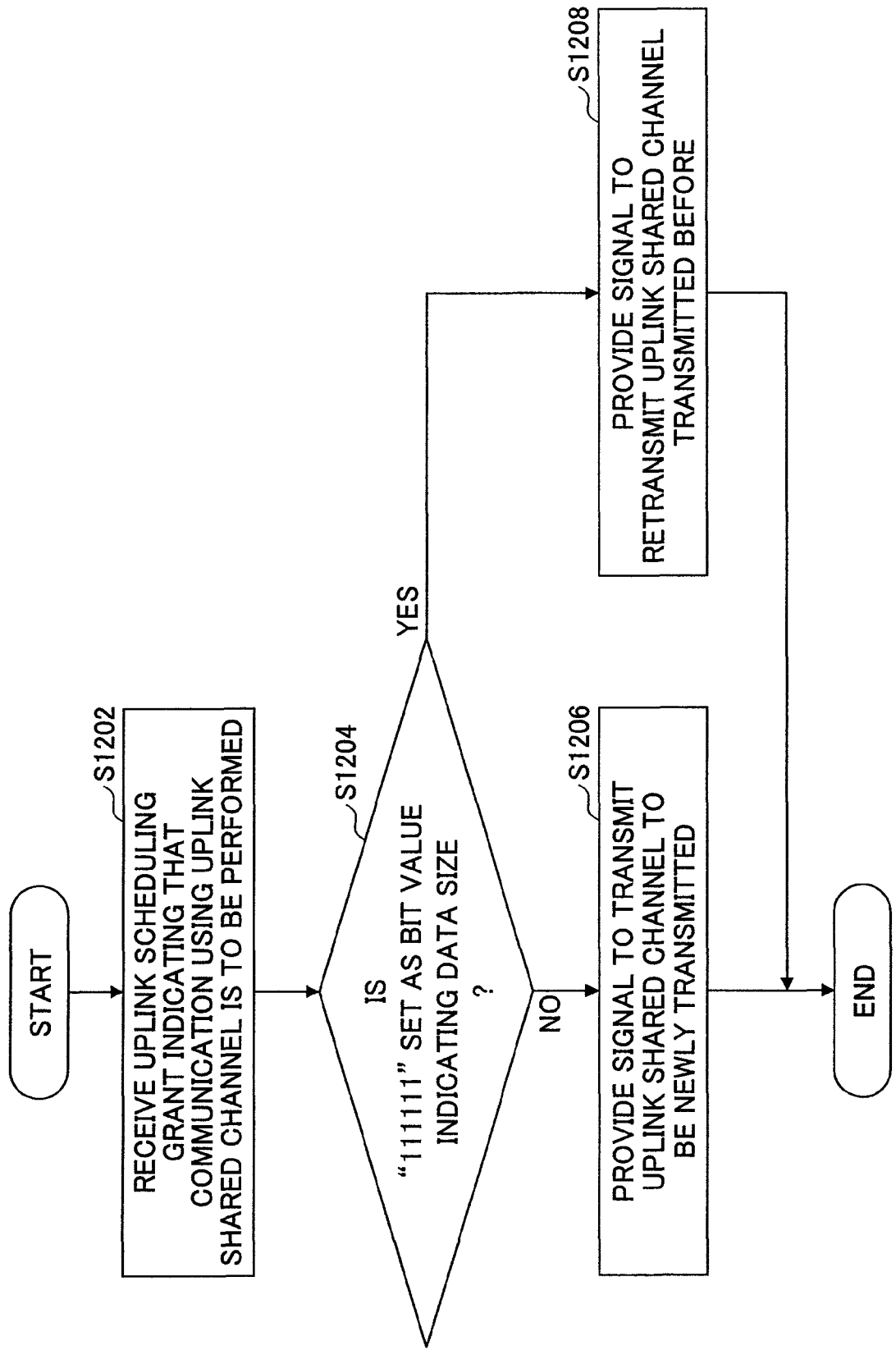

BASE STATION APPARATUS, USER EQUIPMENT, AND METHOD USED IN MOBILE COMMUNICATION SYSTEM

TECHNICAL FIELD

The present invention relates to a base station apparatus, user equipment, and a method used in a mobile communication system.

BACKGROUND ART

As a next-generation communication system of the W-CDMA (Wideband Code Division Multiple Access) system, HSDPA (High Speed Downlink Packet Access) system, HSUPA (High Speed Uplink Packet Access) system and the like, namely an LTE (Long Term Evolution) system has been studied by 3GPP ($3^{rd}$ Generation Partnership Project) which is a standards body of the W-CDMA. In the LTE system as a radio access system, an OFDM (Orthogonal Frequency Division Multiplexing) scheme and an SC-FDMA (Single-Carrier Frequency Division Multiple Access) scheme have been studied as prospective candidate schemes to be applied to the downlink communications system and the uplink communications system, respectively (see, for example, Non Patent Document 1).

The OFDM scheme is a multi-carrier transmission scheme in which a frequency band is divided into plural sub-carriers having narrower frequency bands, and data are mapped onto the sub-carriers. By closely and orthogonally arranging the sub-carriers (partially overlapping, though) along the frequency axis, the achievement of faster transmission and further improvement of the efficiency of using the frequency are expected.

The SC-FDMA scheme is a single carrier transmission scheme in which a frequency band is divided with respect to user equipment (hereinafter may be referred to as a user equipment (UE) terminal or a mobile station) in a manner so that different frequencies can be separately used (allocated) among plural terminals (user equipment (UE) terminals); and as a result, interference between the terminals may be easily and effectively reduced. Further, preferably, in the SC-FDMA scheme, a range of transmission power fluctuation may be made smaller; therefore, lower energy consumption of terminals may be achieved and a wider coverage area may also be obtained.

In both uplink and downlink of the LTE system (scheme), communications can be performed by sharing one or more physical channels among plural user equipment (UE) terminals. The channel shared plural user equipment (UE) terminals may generally be called a shared channel. In the LTE system, the channel in uplink is called a Physical Uplink Shared Channel (PUSCH) and the channel in downlink is called a Physical Downlink Shared Channel (PDSCH). Further, as the logical channel, the shared channel in uplink is called an Uplink Shared Channel (UL-SCH) and the shared channel in downlink is called a Downlink Shared Channel (DL-SCH).

Further, in the communication system using the shared channels, it is required to perform Signaling to report which shared channel is to be allocated to which user equipment (UE) terminal with respect to each sub-frame (having 1 ms in the LTE scheme). To perform the Signaling, a control channel is generally used. In the LTE system, the control channel may be called a Physical Downlink Control Channel (PDCCH) or a Downlink L1/L2 Control Channel (DL-L1/L2 Control Channel). The Physical Downlink Control Channel (PDCCH) includes information items indicating such as Downlink Scheduling Information, Acknowledgement Information (ACK/NACK), Uplink Scheduling Grant, an Overload Indicator, a Transmission Power Control Command Bit and the like (see, for example, Non Patent Document 2). The Acknowledgement Information (ACK/NACK) may also be called a Physical Hybrid ARQ Indicator Channel (PHICH). The Physical Hybrid ARQ Indicator Channel (PHICH) may be defined as a separate physical channel similar to the Physical Downlink Control Channel (PDCCH).

Further, the sub-frame may also be called a TTI (Transmission Time Interval).

The Downlink Scheduling Information and the Uplink Scheduling Grant correspond to the information to be used to perform the Signaling to report which shared channel is to be allocated to which user equipment (UE) terminal. The Downlink Scheduling Information includes the information items of the shared channel in downlink, for example, the information items indicating allocation information of Resource Blocks for downlink, ID of the user equipment (UE) terminal, the number of streams, information of a Precoding Vector, data size, modulation scheme, information of an HARQ (Hybrid Automatic Repeat reQuest) and the like. On the other hand, the Uplink Scheduling Grant includes the information items of the shared channel in uplink, for example, the information items indicating allocation information of Resource Blocks for uplink, ID of the user equipment (UE) terminal, data size, modulation scheme, transmission power information in uplink, information of Demodulation Reference Signal in Uplink MIMO and the like.

In the meantime, as an HARQ scheme in uplink of the LTE system, a Synchronous HARQ scheme is proposed to be applied (see Non Patent Document 3) to the LTE system. When the Synchronous HARQ scheme is applied, the Uplink Scheduling Grant is transmitted from the base station apparatus to the user equipment (UE) terminal with respect to initial transmission of an uplink shared channel; however, the Uplink Scheduling Grant is not transmitted with respect to retransmission of the uplink shared channel. In this case, when the user equipment (UE) terminal is required to retransmit the uplink shared channel, the user equipment (UE) terminal retransmits the uplink shared channel at a predetermined timing. On the other hand, there is another proposal that the Uplink Scheduling Grant be arranged to be transmitted with respect to the retransmission of the uplink shared channel on an as-needed basis (see Non Patent Document 4). In this case as well, the user equipment (UE) terminal retransmits the uplink shared channel at the predetermined timing.

Further, when the HARQ is applied in uplink of the (LTE) system, the Acknowledgement Information (ACK/NACK) with respect to the uplink shared channel is transmitted from the base station apparatus to the user equipment (UE) terminal; and based on the received Acknowledgement Information (ACK/NACK), the user equipment (UE) terminal determines whether the user equipment (UE) terminal should retransmit the uplink shared channel and retransmits the uplink shared channel based on a result of the determination. The Acknowledgement Information (ACK/NACK) herein corresponds to the Acknowledgement Information included in the Physical Downlink Control Channel (PDCCH), as described above.

Non Patent Document 1: 3GPP TR 25.814 (V7.0.0), "Physical layer Aspects for Evolved UTRA," June 2006

Non Patent Document 2: 3GPP R1-070103, Downlink L1/L2 Control Signaling Channel Structure: Coding Non Patent Document 3: 3GPP TR 36.300 (V0.3.1), "Evolved Universal Terrestrial Radio Access (E-UTRA)

and Evolved Universal Terrestrial Radio Access Network (E-UTRAN); Overall description; Stage 2, 9.1," November 2006

Non Patent Document 4: 3GPP R1-070060, "Resource fragmentation in LTE uplink," January 2007

DISCLOSURE OF INVENTION

Problems to be Solved by the Invention

The background art, however, may have the following problem(s).

When the retransmission of the uplink shared channel is required, in addition to the transmission of "NACK" response as the Acknowledgement Information (ACK/NACK), it has been proposed that the Uplink Scheduling Grant be also arranged to be transmitted with respect to the retransmission of the uplink shared channel. The Uplink Scheduling Grant is used to determine (set) the resource blocks to be used for packet data to be retransmitted and adequate transmission power of the uplink shared channel. However, the fact remains that the Synchronous HARQ scheme is applied to the system; therefore, the timing of the retransmission of the uplink shared channel is determined in advance. Under such conditions, when the "NACK" response of the Acknowledgement Information is incorrectly recognized as "ACK" response of the Acknowledgement Information, by the user equipment (UE) terminal (i.e., when the base station apparatus transmits the "NACK" response; however, the user equipment (UE) terminal incorrectly recognizes the "NACK" response as the "ACK" response), the user equipment (UE) terminal incorrectly recognizes the received Uplink Scheduling Grant specifying the retransmission of the uplink shared channel as the Uplink Scheduling Grant specifying new transmission (initial transmission) of the uplink shared channel and newly transmits the uplink shared channel as the new (initial) transmission. Further, in this case, the base station apparatus recognizes the newly transmitted uplink shared channel as the retransmitted uplink shared channel; therefore, it may become difficult for the base station apparatus to correctly receive (recognize) the newly transmitted uplink shared channel. Further, when the HARQ scheme is applied to the system, a signal currently received is combined (used) with the corresponding signal previously received and stored in a Soft Buffer so as to improve error correction capability. However, as described above, when the base station apparatus incorrectly recognizes the newly transmitted uplink shared channel as the uplink shared channel to be transmitted, the received newly transmitted uplink shared channel is combined with the signal stored in the Soft Buffer. As a result, it may become almost impossible to correctly decode the signal to obtain significant data, and unfortunately, the signal may be repeatedly retransmitted until a predetermined maximum retransmission number is reached. In this case, the efficiency of the communication in uplink may be degraded.

The present invention is made in light of the above described circumstances and may make it possible to ensure correct communications using the uplink shared channel between the user equipment (UE) terminal and the base station apparatus even when, for example, the "NACK" response of the Acknowledgement Information is incorrectly recognized as "ACK" response by the user equipment (UE) terminal. In other words, according to an embodiment of the present invention, there are provided a radio communication system and a base station apparatus, a user equipment (UE) terminal, and a communication control method in the radio communication system capable of improving the efficiency of uplink communication.

Means for Solving the Problems

According to an aspect of the present invention, there is provided a base station apparatus communicating with a user equipment terminal in a mobile communication system. The base station apparatus includes a determination unit determining whether an uplink signal received from the user equipment terminal is to be retransmitted, a control information generation unit generating control information to permit the user equipment terminal to transmit an uplink signal, and a transmission unit transmitting the control information to the user equipment terminal. Further, in the base station apparatus, when the determination unit determines that the uplink signal is to be retransmitted, the control information generation unit generates the control information so as to include retransmission information indicating that an uplink signal transmitted before from the user equipment terminal is to be retransmitted.

BRIEF DESCRIPTION OF THE DRAWINGS

FIG. 2 is a drawing showing exemplary bit allocation of an Uplink Scheduling Grant;

FIG. 3 is a table showing an example of relationships between the bits indicating data sizes and the data sizes;

FIG. 4 is a table showing an example of relationships between the bits indicating transmission power values and the transmission power values;

FIG. 11 is a flowchart showing a process performed in the base station apparatus; and FIG. 12 is a flowchart showing a process performed in the user equipment (UE) terminal.

EXPLANATION OF REFERENCES

50: CELL
$100_1, 100_2, 100_3, 100_n$: USER EQUIPMENT TERMINAL(S)
102: TRANSMISSION/RECEIVING ANTENNA
104: AMPLIFIER
106: TRANSMISSION/RECEIVING SECTION
108: BASEBAND SIGNAL PROCESSING SECTION
110: APPLICATION SECTION
1081: LAYER 1 PROCESSING SECTION
1082: MAC PROCESSING SECTION
1083: RLC PROCESSING SECTION
200: BASE STATION APPARATUS

202: TRANSMISSION/RECEIVING ANTENNA
204: AMPLIFIER
206: TRANSMISSION/RECEIVING SECTION
208: BASEBAND SIGNAL PROCESSING SECTION
210: CALL PROCESSING SECTION
212: TRANSMISSION PATH INTERFACE
2081: LAYER 1 PROCESSING SECTION
2082: MAC PROCESSING SECTION
2083: RLC PROCESSING SECTION
300: ACCESS GATEWAY APPARATUS
400: CORE NETWORK
1000: RADIO COMMUNICATION SYSTEM

BEST MODE FOR CARRYING OUT THE INVENTION

In the following, an embodiment of the present invention is described with reference to accompanying drawings. Throughout the figures, the same numbers are used to refer to the same or equivalent elements and the repeated description of such elements may be omitted.

First, a radio communication system including a user equipment (UE) terminal and a base station apparatus according to an embodiment of the present invention is described with reference to FIG. 1.

Figure 1:
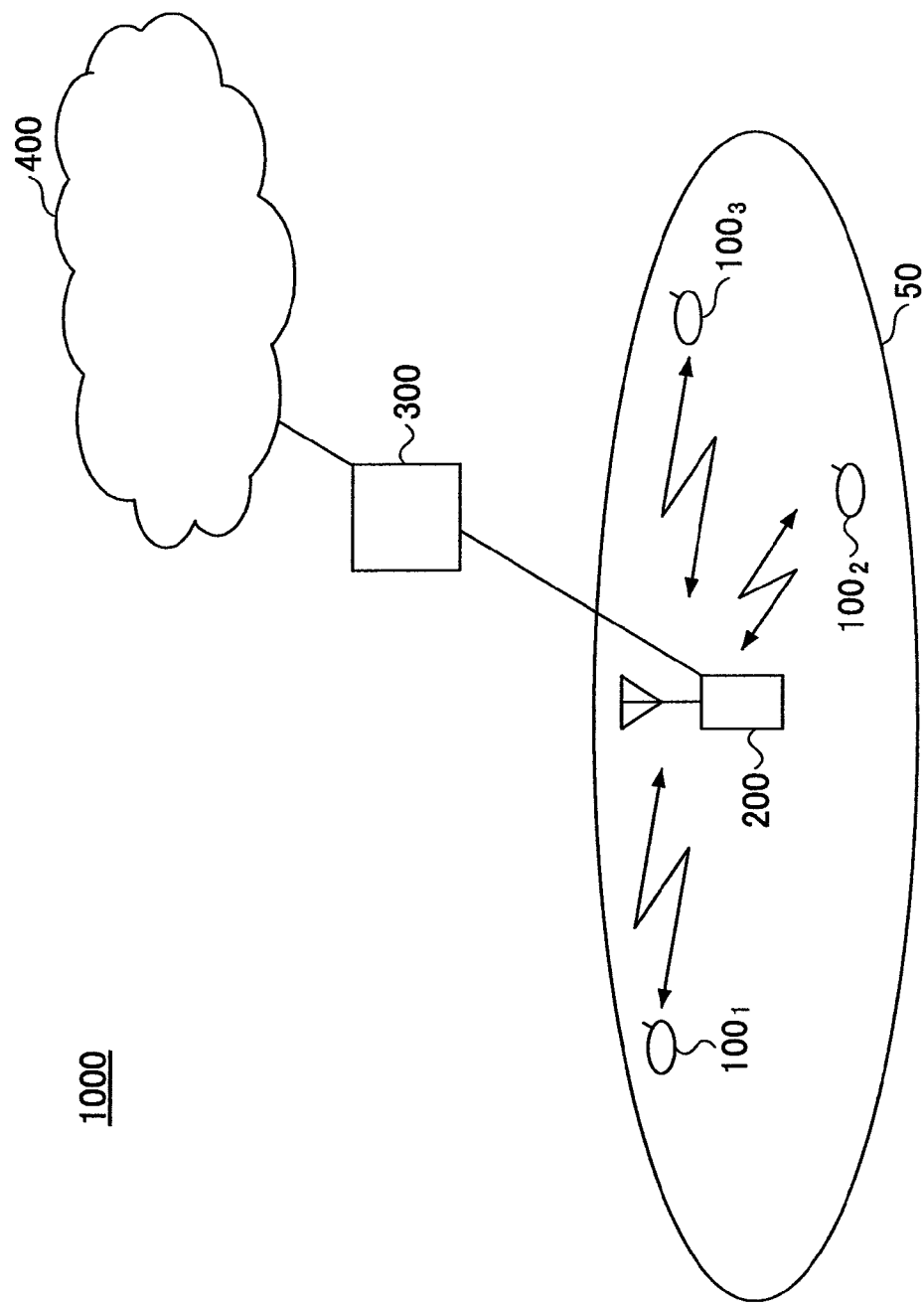
FIG. 1 is a drawing schematically showing a radio communication system.

FIG. 1 schematically shows a radio communication system $1000$ including user equipment terminals $100_1$ through $100_3$ and a base stations apparatus $200$ according to an embodiment of the present invention.

As shown in FIG. 1, the radio communication system $1000$, which may be an Evolved UTRA (Universal Terrestrial Radio Access) and UTRAN (UTRA Network) system (a.k.a. an LTE (Long Term Evolution) system or a super 3G system), includes a base station apparatus (eNB: eNode B) $200$ and user equipment (UE) $100_n$ ($100_1, 100_2, 100_3, \ldots, 100_n$; n: an integer greater than zero (0)) (hereinafter, the user equipment (UE) may be referred to as a user equipment (UE) terminal(s)). The base station apparatus $200$ is connected to an upper node station such as an access gateway apparatus $300$. The access gateway apparatus $300$ is connected to a core network $400$. In this case, the user equipment (UE) terminals $100_n$ are in communication with the base station apparatus $200$ in a cell $50$ based on the Evolved UTRA and UTRAN system (scheme).

Herein, the user equipment (UE) terminals ($100_1, 100_2, 100_3, \ldots 100_n$) have the same configuration, functions, and statuses; therefore, unless otherwise described, the user equipment (UE) terminals ($100_1, 100_2, 100_3, \ldots 100_n$) may be collectively described as a user equipment (UE) terminal(S) $100_n$. For explanatory purposes, it is the user equipment (UE) terminals described herein that communicate with the base station apparatus. However, more generally, it is assumed that the term user equipment (UE) (terminal) includes moving terminals (mobile stations) and fixed terminals.

In the radio communication system $1000$, an OFDM (Orthogonal Frequency Division Multiplexing) scheme and an SC-FDMA (Single-Carrier Frequency Division Multiple Access) scheme are used in downlink communications and uplink communications, respectively. The OFDM scheme is a multi-carrier transmission scheme in which a frequency band is divided into plural narrower frequency bands (sub-carriers), and data are mapped onto the sub-carriers. On the other hand, the SC-FDMA scheme is a single carrier transmission scheme in which a frequency band is divided with respect to user equipment (UE) terminals in a manner so that different frequencies can be separately used among the plural user equipment (UE) terminals; and as a result, interference between terminals may be reduced.

Next, communication channels used in the Evolved UTRA and UTRAN system are described.

With respect to downlink communications, a Physical Downlink Shared Channel (PDSCH) shared among user equipment (UE) terminals $100_n$ and a Physical Downlink Control Channel (PDCCH) are used. The Physical Downlink Control Channel (PDCCH) may also be called a Downlink L1/L2 Control Channel (DL-L1/L2 Control Channel). Via the Physical Downlink Shared Channel (PDSCH), user data (i.e., a general data signal) are transmitted. On the other hand, via the Physical Downlink Control Channel (PDCCH), Downlink Scheduling Information, Acknowledgement Information (ACK/NACK), Uplink Scheduling Grant, an Overload Indicator, Transmission Power Control Command Bit and the like are transmitted. The Downlink Scheduling Information includes, for example, an ID of the user (user equipment (UE) terminal) who communicates using the Physical Downlink Shared Channel (PDSCH), transport format information of the user data of the user, namely data size, modulation scheme, information of an HARQ (Hybrid Automatic Repeat reQuest), allocation information of resource blocks for downlink communications and the like.

The Acknowledgement Information (ACK/NACK) may also be called a Physical Hybrid ARQ Indicator Channel (PHICH). The Physical Hybrid ARQ Indicator Channel (PHICH) may be defined as a separate physical channel similar to the Physical Downlink Control Channel (PDCCH).

On the other hand, the Uplink Scheduling Grant includes for example, an ID of the user (user equipment (UE) terminal) who communicates using the Physical Uplink Shared Channel (PUSCH), transport format information of the user data of the user, namely data size, modulation scheme, allocation information of resource blocks for uplink communications, information of the transmission power of the uplink shared channel and the like. Herein, the resource blocks for uplink communications correspond to frequency resource and may also be called resource units.

With respect to uplink communications, a Physical Uplink Shared Channel (PUSCH) shared among user equipment (UE) terminals $100_n$ and a Physical Uplink Control Channel (PUCCH) are used. Via the Physical Uplink Shared Channel (PUSCH), the user data (i.e., the general data signal) are transmitted. On the other hand, via the Physical Uplink Control Channel (PUCCH), a downlink Channel Quality Indicator (CQI) to be used for a scheduling process, an Adaptive Modulation and Coding Scheme (AMCS) of the Physical Downlink Shared Channel (PDSCH), the Acknowledgement Information (ACK/NACK) with respect to the Physical Downlink Shared Channel (PDSCH) and the like are transmitted. As the Acknowledgement Information (ACK/NACK), either an "ACK (Acknowledgement)" response indicating that the transmitted signal has been adequately (correctly) received or a "NACK (Negative Acknowledgement)" response indicating that the transmitted signal has not been adequately (correctly) received is transmitted.

Further, via the Physical Uplink Control Channel (PUCCH), in addition to the CQI and the Acknowledgement Information (ACK/NACK), a Scheduling Request for resource allocation for the uplink shared channel, a Release Request in Persistent Scheduling and the like may also be transmitted. Herein, the resource allocation for the uplink shared channel means that, via the Physical Downlink Control Channel (PDCCH) in a sub-frame, the base station apparatus reports to the user equipment (UE) terminal that the user equipment (UE) terminal is able to communicate with the base station apparatus using the uplink shared channel in a following subframe.

With reference to FIG. 2, bit allocation of the Uplink Scheduling Grant transmitted via the Physical Downlink Control Channel (PDCCH) from the base station apparatus 200 according to an embodiment of the present invention is described. As shown in FIG. 2, the Uplink Scheduling Grant includes bits indicating data size, bits indicating modulation scheme, bits indicating allocation information of frequency resources (i.e., resource blocks), bits indicating information of transmission power, CRC bits masked by bits indicating an ID of the user equipment (UE) terminal communicating using the uplink shared channel and the like.

In the following, the information bits included in the Uplink Scheduling Grant are separately described in detail.
<Bits Indicating Data Size>

As shown in FIG. 3, the values of the "bits indicating data size" may be associated with the data size. The table of FIG. 3 may be defined with respect to the modulation schemes or with respect to the numbers of resources blocks. In the case of FIG. 3, when the Uplink Scheduling Grant includes a value "111111" which is the last (highest) ($64^{th}$) value among 64 values that can be expressed using six (6) bits as the value of the "bits indicating data size", the Uplink Scheduling Grant indicates (specifies) that, in the next permitted uplink transmission from the user equipment (UE) terminal, the uplink shared channel transmitted before is to be retransmitted.

When the Uplink Scheduling Grant specifies the retransmission of the uplink shared channel as described above, it is configured so that the value of the "bits indicating data size" is set equal to "111111" without fail. This configuration largely differs from a conventional scheme where no such specific value specifying the retransmission of the uplink shared channel is set as the value of, for example, the "bits indicating data size" of the Uplink Scheduling Grant. Further, in a case of retransmission in response to the specification by the Uplink Scheduling Grant, even when the value "111111" is set without fail as the value of the "bits indicating data size", the user equipment (UE) terminal $100_n$ can easily recognize the data size of the uplink shared channel because the data size in the retransmission is to be the same as that in the corresponding initial transmission. Namely, the user equipment (UE) terminal $100_n$ is able to transmit the uplink shared channel assuming that the data size of the uplink shared channel to be retransmitted is the same as that of the uplink shared channel initially transmitted.

As described above, by defining (using) a part of the values of the "bits indicating data size" as the data indicating (specifying) the retransmission of the uplink shared channel in the next permitted unlink transmission, it may become possible for the user equipment (UE) terminal $100_n$ to easily recognize whether the received Uplink Scheduling Grant is for the initial transmission (new transmission) or the retransmission of the uplink shared channel. In this case, the "bits indicating data size" may also be called a TFRI (Transport Format Resource Indicator) or the like.

Further, in the above example, a case is described where the number of the "bits indicating data size" is six (6) (like "111111"). However, the number of the "bits indicating data size" may be greater than or less than six (6) (for example, four (4) bits or 5 bits). Further, in the above example, a case is described where the value "111111" is used as the vale indicating that "the uplink shared channel transmitted before is to be retransmitted". However, any other value such as "111110", "111101" or the like may be alternatively used. Further, any other adequate value determined in advance between the user equipment (UE) terminal $100_n$ and the base station apparatus 200 may be alternatively used as long as the Uplink Scheduling Grant includes a specific value associated with the information indicating whether the retransmission is required in addition to the Acknowledgement Information (ACK/NACK). However, from the viewpoint of maintaining the linearity between the values expressed using the number of bits and the data sizes as much as possible, it may be preferable to use a boundary value of the range of the values indicating the data sizes. Further, it may be more preferable to use, for example, the last (i.e., the greatest) value among the values that can be expressed by using the number of bits as the value indicating that "the uplink shared channel transmitted before is to be retransmitted".
<Bits Indicating Modulation Scheme>

For example, the relationship between the values of the "bits indicating modulation scheme" and the modulation schemes may be defined as follows:
(00): QPSK
(01): 16 QAM
(10): 64 QAM
(11): N/A (Not Applicable)
<Bits Indicating Allocation Information of Resource Blocks>

The relationship between the values of the "bits indicating allocation information of resource blocks" and the allocation information of resource blocks may be defined by, for example, associating the resource block numbers indicating both ends of the range of the resource blocks that may be allocated to the uplink shared channel (i.e., the highest resource block and the lowest resource block in the range) with the value of the "bits indicating allocation information of resource blocks". The relationship between the value of the "bits indicating allocation information of resource blocks" and the resource blocks numbers indicating both ends of the range of the resource blocks that may be allocated to the uplink shared channel and is described in, for example, the following Document.
3GPP, R1-061308
<Bits Indicating Information of Transmission Power>

The relationship between the values of the "bits indicating information of transmission power" and the information of the transmission power may be defined as shown in a table of FIG. 4. In this case, the information of the transmission power may be referred to as, for example, an offset value with respect to a Sounding Reference Signal (i.e., a difference between the transmission power value of the uplink shared channel and the transmission power value of the Sounding Reference Signal). Otherwise, the transmission power value may be expressed using an absolute value.

Otherwise, the value of the "bits indicating information of transmission power" may represent a relative value with respect to the transmission power value of the previous transmission or may be a value of "Δ" in the following formula.

$$P_{PUSCH}(i) = \min\{P_{max}, 10 \log_{10}(M_{PUSCH}(i)) + P_{O\_PUSCH} + \alpha PL + \Delta_{MCS}(MCS(i)) + f(i)\}$$

Where:
i: index indicating sub-frame
$P_{PUSCH}(i)$: transmission power of PUSCH in sub-frame#i
$P_{max}$: maximum transmission power of user equipment (UE) terminal
$M_{PUSCH}$: the number of Resource Blocks (RB)
$P_{O\_PUSCH}$: parameter designated by network (NW)
α: parameter designated by the network (NW)
PL: Pathloss value
$\Delta_{MSC}$: offset value set with respect to each Modulation and Coding Scheme (MCS)

f(i): offset value for adjustment, f(i)=f(i−1)+Δ

<CRC Bits Masked by Bits Indicating an ID of the User Equipment (UE) Terminal Communicating Using the Uplink Shared Channel>

The value of the "CRC bits masked by bits indicating an ID of the user equipment (UE) terminal communicating using the uplink shared channel" may be obtained by, for example, masking 16 CRC bits by using 16 bits data indicating the ID of the user equipment (UE) terminal, the CRC bits being calculated based on the "bits indicating data size", the "bits indicating modulation scheme", the "bits indicating allocation information of resource blocks" and the "bits indicating information of transmission power".

The information bits shown in FIG. 2 and the numbers of the information bits are one example only. Therefore, any information bits other than the information bits shown in FIG. 2 may be transmitted as the information of the Uplink Scheduling Grant, or only a part of information bits shown in FIG. 2 may be transmitted as the information of the Uplink Scheduling Grant. Further, any number of bits other than the number of information bits shown in FIG. 2 may be used.

The relationships between the values of "bits indicating data size" and the data sizes and the relationships between the values of the "bits indicating information of transmission power" and the information of the transmission power shown in FIGS. 3 and 4, respectively, are examples only.

In the above example in FIG. 3, a case is described where one value of 64 values expressed by using the "bits indicating data size" is defined as the value indicating the requirement of the retransmission in the Uplink Scheduling Grant to specify the retransmission of the uplink shared channel transmitted before. However, alternatively, a part of any other information bits in the Uplink Scheduling Grant may be used to indicate the requirement of the retransmission. For example, a value "11" of the "bits indicating modulation scheme" in the Uplink Scheduling Grant may be defined (used) to indicate the requirement of the retransmission of the uplink shared channel.

Figure 5:
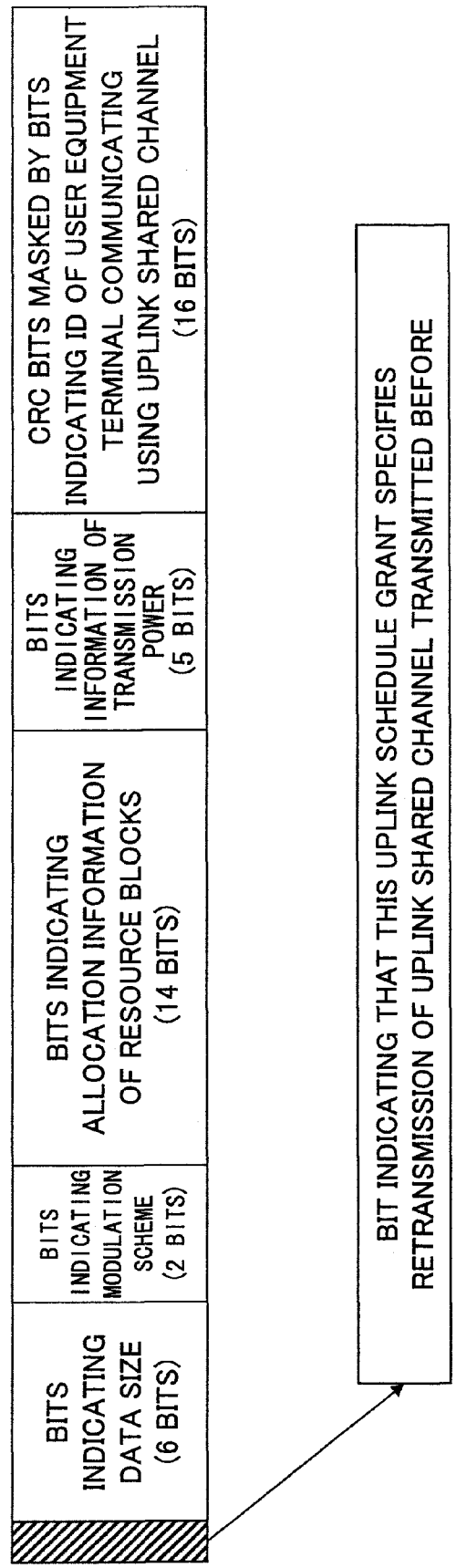
FIG. 5 is a drawing showing another bit allocation of the Uplink Scheduling Grant.

Further, as described above, in the above example in FIG. 3, a case is described where one value of 64 values expressed by using the "bits indicating data size" is defined as the value indicating the requirement of the retransmission in the Uplink Scheduling Grant to specify the retransmission of the uplink shared channel transmitted before. However, alternatively, a bit other than the "bits indicating data size" may be separately provided to indicate the requirement of the retransmission. For example, as shown in FIG. 5, one bit in addition to the "bits indicating data size" may be provided in the Uplink Scheduling Grant so that the values of the bit indicate whether the Uplink Scheduling Grant specifies the retransmission of the uplink shared channel transmitted before. In this case, for example, whether the values of the bit in the Uplink Scheduling Grant indicate "the Uplink Scheduling Grant specifying the retransmission of the uplink shared channel transmitted before" may be defined as follows:

(When the value of the bit is 0): the Uplink Scheduling Grant specifies the transmission of the uplink shared channel as the initial transmission (new transmission).

(When the value of the bit is 1): the Uplink Scheduling Grant specifies the retransmission of the uplink shared channel transmitted before.

Otherwise, the value of the bits may be defined as follows:

(When the value of the bit is increased when compared with the corresponding value upon the previous transmission in the same process): the Uplink Scheduling Grant specifies the transmission of the uplink shared channel as the initial transmission (new transmission).

(When the value of the bit is not increased when compared with the corresponding value upon the previous transmission in the same process): the Uplink Scheduling Grant specifies the retransmission of the uplink shared channel transmitted before.

The increase of the value of the bit refers to a case when the value changes from 0 to 1 or from 1 to 0.

Figure 6:
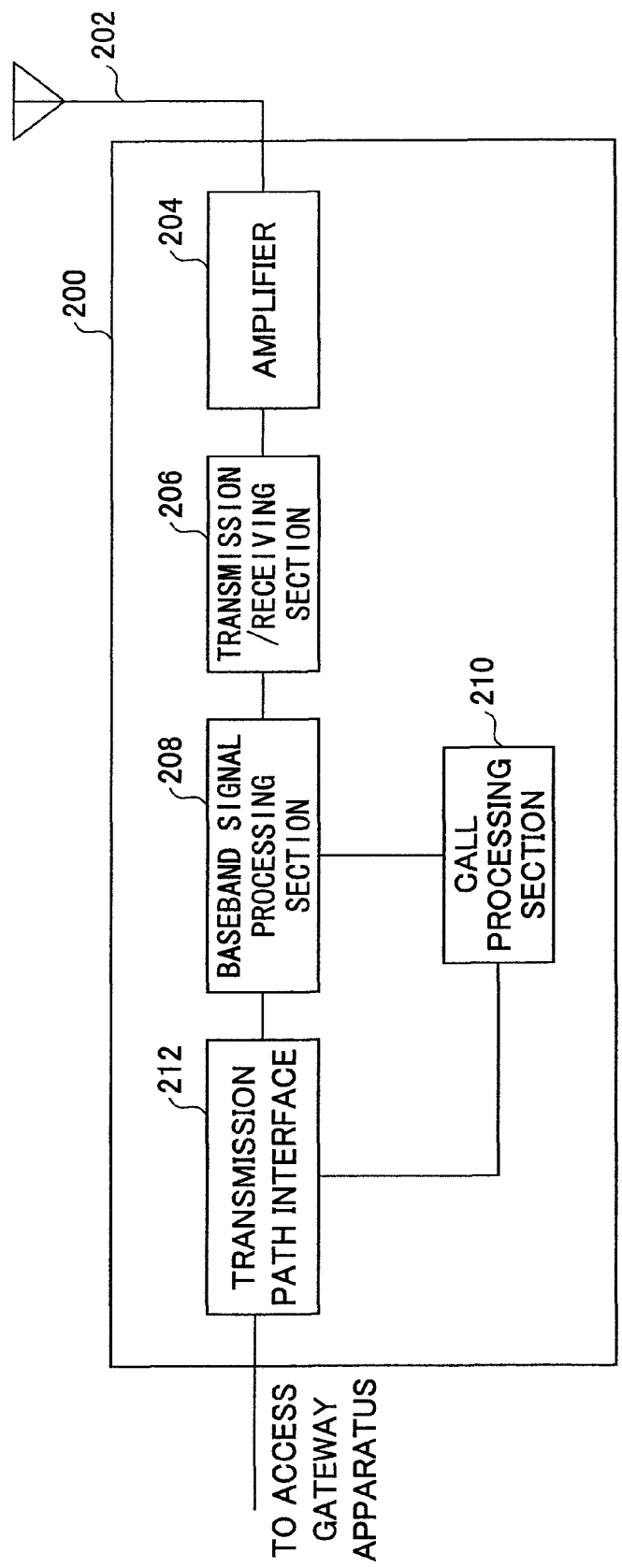
FIG. 6 is a partial block diagram of a base station apparatus according to an embodiment of the present invention.

Next, a base station apparatus 200 according to an embodiment of the present invention is described with reference to FIG. 6. FIG. 6 schematically shows an exemplary configuration of the base station apparatus 200 according to an embodiment of the present invention.

As shown in FIG. 6, the base station apparatus 200 includes a transmission/receiving antenna 202, an amplifier 204, a transmission/receiving section 206, a baseband signal processing section 208, a call processing section 210, and a transmission path interface 212.

The user data transmitted from the base station apparatus 200 to the user equipment (UE) terminal $100_n$ in downlink are transmitted from a higher station (e.g., the access gateway apparatus 300) located at a higher layer than the base station apparatus 200 to the baseband signal processing section 208 via the transmission path interface section 212 of the base station apparatus 200.

In the baseband signal processing section 208, segmentation and concatenation of the user data, an RLC-layer transmission processes such as RLC (Radio Link Control) retransmission control, MAC (Medium Access Control) retransmission control, such as an HARQ (Hybrid Automatic Repeat reQuest) transmission process, a scheduling process, a transport format selection process, a channel coding process, and an IFFT (Inverse Fast Fourier Transform) process are performed; and the signal processed in the baseband signal processing section 208 is transmitted to the transmission/receiving section 206. Further, with respect to a signal of a Physical Downlink Control Channel (PDCCH) which is a downlink control channel (DL-CCH), the transmission processes such as the channel coding, the IFFT and the like are performed; and the processed signal is also transmitted to the transmission/receiving section 206.

In the transmission/receiving section 206, a frequency conversion process is performed so that the baseband signal output from the baseband signal processing section 208 is converted into a signal in a radio-frequency band. Then the converted signal is amplified by the amplifier 204 and transmitted via the transmission/receiving antenna 202.

On the other hand, regarding the user data transmitted from the user equipment (UE) terminal $100_n$ to the base station apparatus 200k, a signal of the user data in the radio frequency is received by the transmission/receiving antenna 202, amplified by the amplifier 204, frequency-converted by the transmission/receiving section 206 into a baseband signal, and input into the baseband signal processing section 208 of the base station apparatus 200.

In the baseband signal processing section 208, with respect the user data included in the input baseband signal, an FFT (Fast Fourier Transform) process, an error correction decoding process, a reception process of the MAC retransmission control, and a reception process of the RLC layer data are performed; and the processed signal is transmitted to the access gateway apparatus 300 via the transmission path interface section 212.

Further, as described below, when the Uplink Scheduling Grant specifying the retransmission of the uplink shared channel to be transmitted, the baseband signal processing section 208 sets the value of "bits indicating data size" to the value indicating that the Uplink Scheduling Grant specifies the retransmission of the uplink shared channel transmitted before.

The call processing section 210 performs call processes such as setting and releasing a communication channel, management of the base station apparatus 200, and management of radio resources.

Figure 7:
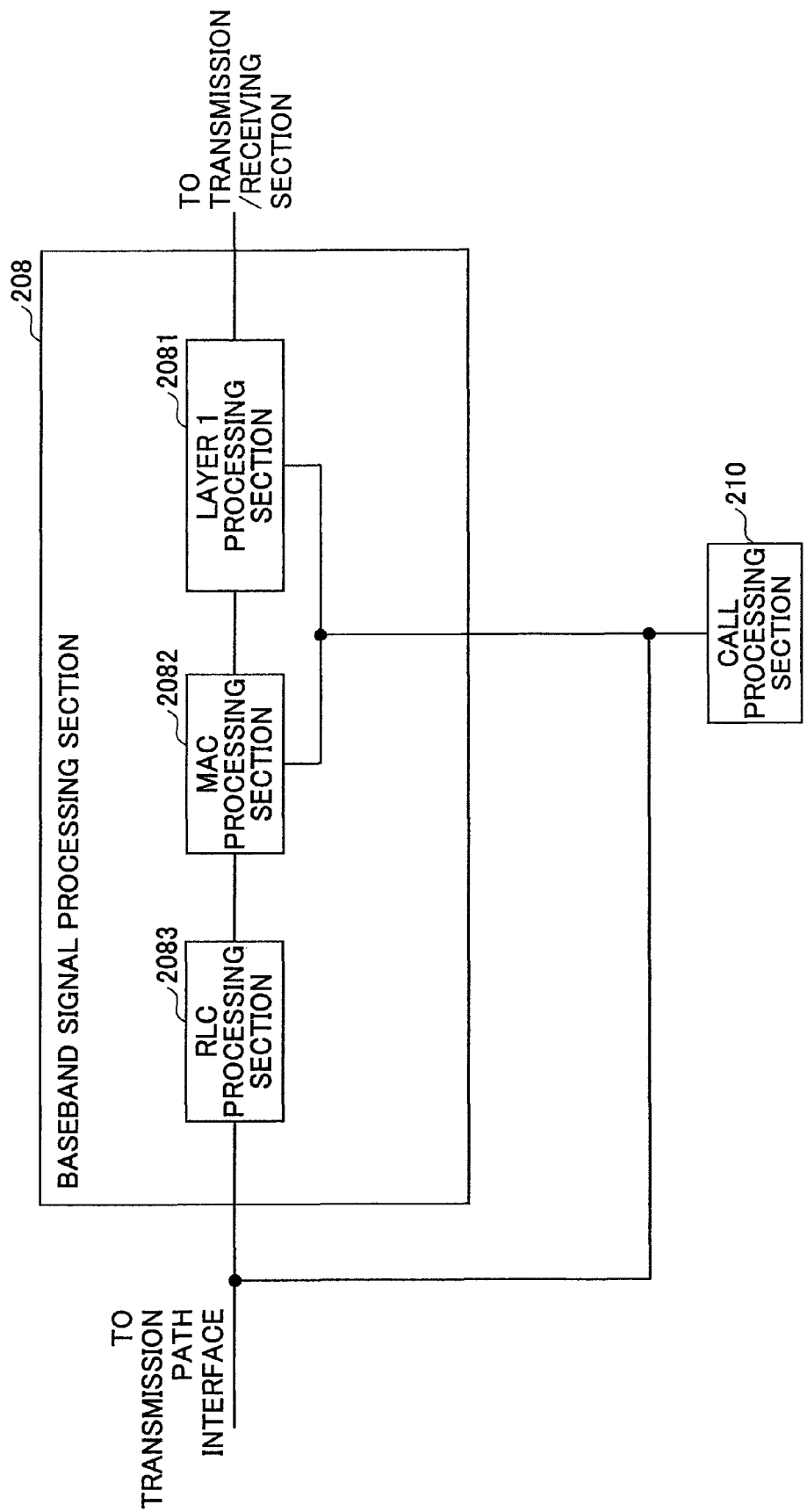
FIG. 7 is a partial block diagram of the baseband signal processing section of the base station apparatus in FIG. 6.

Next, an exemplary configuration of the baseband signal processing section 208 is described with reference to FIG. 7. FIG. 7 shows an exemplary configuration of the baseband signal processing section 208.

As shown in FIG. 7, the baseband signal processing section 208 includes a layer 1 processing section 2081, a MAC processing section 2082, and an RLC processing section 2083.

In the baseband signal processing section 208, the layer 1 processing section 2081, the MAC processing section 2082, and the RLC processing section 2083 are connected to each other.

The layer 1 processing section 2081 performs the channel coding, the IFFT process and the like with respect to the data transmitted in downlink and the channel decoding, an IDFT process, the FFT process and the like with respect to the data received in uplink.

The layer 1 processing section 2081 receives the Downlink Scheduling Information (including an ID of the user communicating using the Physical Downlink Shared Channel (PDSCH), the information of the transport format of the user data of the user and the like), the Uplink Scheduling Grant (including the ID of the user communicating using the Physical Uplink Shared Channel (PUSCH), the information of the transport format of the user data of the user and the like), and the Acknowledgement Information (ACK/NACK) with respect to the uplink shared channel from the MAC processing section 2082. Further, the layer 1 processing section 2081 performs the transmission processes such as the channel coding process and the IFFT process on the received Downlink Scheduling Information (including the ID of the user communicating using the Physical Downlink Shared Channel (PDSCH), the information of the transport format of the user data of the user and the like), the Uplink Scheduling Grant (including the ID of the user communicating using the Physical Uplink Shared Channel (PUSCH), the information of the transport format of the user data of the user and the like), and the Acknowledgement Information (ACK/NACK) with respect to the uplink shared channel. The received Downlink Scheduling Information (including the ID of the user communicating using the Physical Downlink Shared Channel (PDSCH), the information of the transport format of the user data of the user and the like), the Uplink Scheduling Grant (including the ID of the user communicating using the Physical Uplink Shared Channel (PUSCH), the information of the transport format of the user data of the user and the like), and the Acknowledgement Information (ACK/NACK) with respect to the uplink shared channel are mapped onto the Physical Downlink Control Channel (PDCCH) which is a downlink control channel (DL-CCH).

Further, the layer 1 processing section 2081 further performs the demodulation process and the decoding process on the CQI and the Acknowledgement Information (ACK/NACK) mapped onto the Physical Uplink Control Channel (PUCCH) transmitted in uplink and transmits the demodulated and decoded result to the MAC processing section 2082.

The MAC processing section 2082 performs the MAC retransmission control, such as the HARQ transmission process, the scheduling process, the transport format selection process, and a frequency resources allocation process with respect to the downlink user data. In this case, the scheduling process refers to a process of selecting a user equipment (UE) terminal to receive user data using the downlink shared channel (DL-SCH) in a predetermined sub-frame. The transport format selection process refers to a process of determining the modulation scheme, the coding rate, and the data size of the user data to be received by the user equipment (UE) terminal selected in the scheduling process. The determination of the modulation scheme, coding rate, and data size may be performed based on, for example, a value of CQI (Channel Quality Indicator) reported from the user equipment (UE) terminals in uplink. Further, the frequency resources allocation process refers to a process of determining resource blocks to be used for the transmission of the user data received by the user equipment (UE) terminal selected in the scheduling process. The determination of the resource blocks may be performed based on, for example, the value of CQI reported from the user equipment (UE) terminals in uplink. The value of CQI reported from the user equipment (UE) terminals is reported from the layer 1 processing section 2081. Further, the MAC processing section 2082 reports the Downlink Scheduling Information, (i.e., the ID of the user and the information of the transport format of the user data of the user), to the layer 1 processing section 2081, the user communicating using the Physical Downlink Shared Channel (PDSCH) determined in the above various processes (i.e., the scheduling process, the transport format selection process, and the frequency resources allocation process).

Further, the MAC processing section 2082 performs the reception process of the MAC retransmission control, the scheduling process, the transport format selection process, and the frequency resources allocation process with respect to the uplink user data. In this case, the scheduling process refers to a process of selecting a user equipment (UE) terminal transmitting the user data by using a shared channel in a predetermined sub-frame. The transport format selection process refers to a process of determining the modulation scheme, the coding rate, and the data size of the user data to be transmitted by the user equipment (UE) terminal selected in the scheduling process. The determination of the modulation scheme, coding rate, and data size may be performed based on, for example, a value of an SIR (Signal-to-Interference power Ratio) or pathloss value of a Sounding Reference Signal transmitted from the user equipment (UE) terminal in uplink. The frequency resources allocation process refers to a process of determining resource blocks to be used for the transmission of the user data by the user equipment (UE) terminal selected in the scheduling process. The determination of the resource blocks may be performed based on, for example, the value of the SIR of the Sounding Reference Signal transmitted from the user equipment (UE) terminal in uplink. Further, the MAC processing section 2082 reports the Uplink Scheduling Grant, (i.e., the ID of the user and the information of the transport format of the user data of the user), to the layer 1 processing section 2081, the user communicating using the Physical Uplink Shared Channel (PUSCH) determined in the above various processes (i.e., the scheduling process, the transport format selection process, and the frequency resources allocation process). Further, the MAC processing section 2082 generates the Acknowledgement Information (ACK/NACK) based on the reception result of the uplink shared channel and reports the generated Acknowledgement Information (ACK/NACK) with respect to the uplink shared channel to the layer 1 processing section 2081.

In a case where the Uplink Scheduling Grant is required to specify the retransmission of the uplink shared channel, the MAC processing section 2082 sets a specific value (such as "111111") without fail as the value of the "bits indicating data size", the specific value indicating that the Uplink Scheduling Grant specifies the retransmission of the uplink shared channel transmitted before. The setting method of the specific value is similar to the method described with reference to FIGS. 2, 3, and 4.

Otherwise, as described with reference to FIG. 5, when one bit in addition to the "bits indicating data size" is provided in the Uplink Scheduling Grant so that the values of the bit indicates whether the Uplink Scheduling Grant specifies the retransmission of the uplink shared channel transmitted before, the MAC processing section 2082 sets a value of the bit depending on whether the Uplink Scheduling Grant is required to specify the retransmission of the uplink shared channel transmitted before. For example, when the Uplink Scheduling Grant is required to specify the retransmission of the uplink shared channel transmitted before, the MAC processing section 2082 sets a value "1" as the value of the bit; and otherwise, a value "0" is set as the value of the bit.

In the RLC processing section 2083, with respect to the downlink packet data, the RLC-layer transmission processes such as the segmentation and concatenation process and the transmission process of the RLC retransmission control data are performed. Further, in the RLC processing section 2083, with respect to the uplink packet data, the RLC-layer reception processes such as the segmentation and concatenation process and the reception process of the RLC retransmission control data are performed. Further, in addition to the above processes, the RLC processing section 2083 may perform PDCP-layer transmission/receiving processes.

Figure 8:
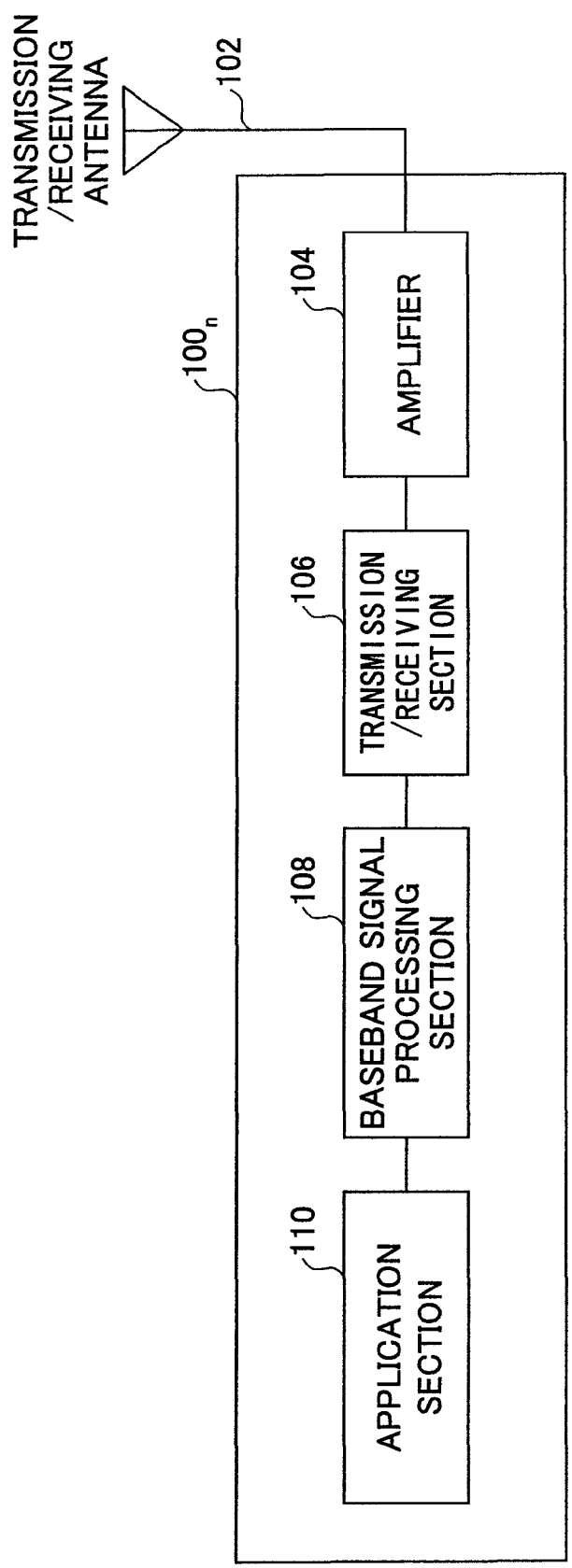
FIG. 8 is a partial block diagram of a user equipment (UE) terminal according to an embodiment of the present invention.

Next, the user equipment (UE) terminal $100_n$ according to an embodiment of the present invention is described with reference to FIG. 8. FIG. 8 shows an exemplary configuration of the user equipment (UE) terminal $100_n$ according to an embodiment of the present invention.

As shown in FIG. 8, the user equipment (UE) terminal $100_n$ includes a transmission/receiving antenna 102, an amplifier 104, a transmission/receiving section 106, a baseband signal processing section 108, and an application section 110.

With respect to downlink data, a radio-frequency signal received by the transmission/receiving antenna 102 is amplified by the amplifier 104 and frequency-converted into a baseband signal by the transmission/receiving section 106. With respect to the converted baseband signal, the baseband signal processing section 108 performs the FFT process, an error correction decoding process, a reception process of retransmission control and the like. The downlink user data included in the downlink data are transmitted to the application section 110. The application section 110 performs processes regarding a layer higher than the Physical layer and the MAC layer and the like.

On the other hand, the uplink user data are input (transmitted) from the application section 110 to the baseband signal processing section 108. The baseband signal processing section 108 performs the segmentation and concatenation process on the user data, RLC-layer transmission processes such as a transmission process of the RLC retransmission control data, MAC-layer transmission processes such as a transmission process of retransmission control data (HARQ), the channel coding process, the DFT process, the IFFT process and the like and transmits the processed user data to the transmission/receiving section 106. The transmission/receiving section 106 performs a frequency-conversion process converting the baseband signal output from the baseband signal processing section 108 into a signal in a radio-frequency band. Then the converted signal in the radio-frequency band is amplified by the amplifier 104 and transmitted via the transmission/receiving antenna 102.

Further, the user data described above may be IP packet data transmitted/received by Web browsing, FTP (File Transfer Protocol), Voice packet data (VoIP) and a control signal for the process of RRC (Radio Resource Control). Further, the name of the user data as a logical channel may be, for example, a DTCH (Dedicated Traffic Channel) or a DCCH (Dedicated Control Channel).

Figure 9:
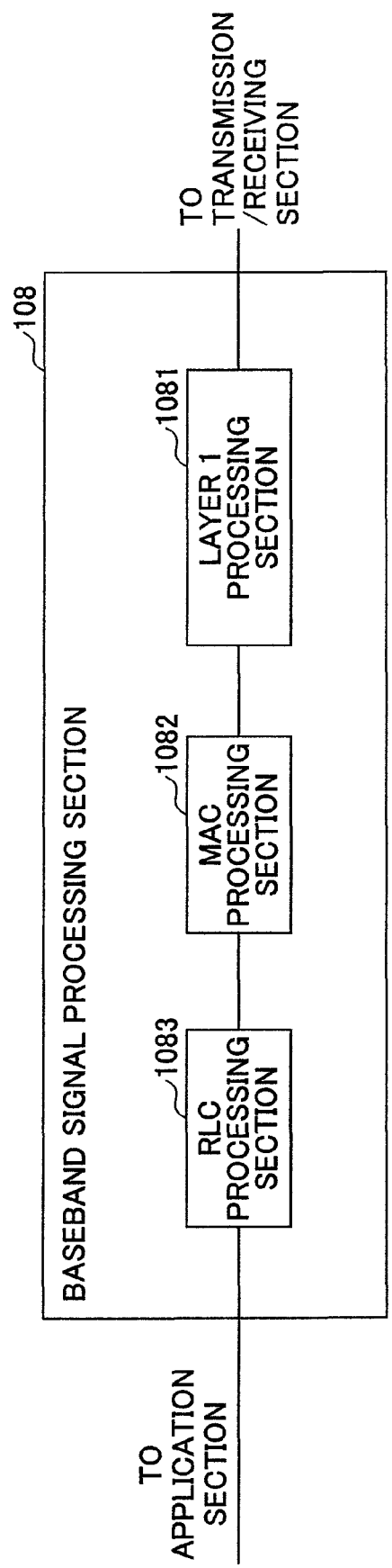
FIG. 9 is a partial block diagram of the baseband signal processing section of the user equipment (UE) terminal in FIG. 8.

Next, an exemplary configuration of the baseband signal processing section 108 is described with reference to FIG. 9. FIG. 9 shows an exemplary configuration of the baseband signal processing section 108 of the user equipment (UE) terminal $100_n$ according to an embodiment of the present invention.

As shown in FIG. 8, the baseband signal processing section 108 includes a layer 1 processing section 1081, a MAC processing section 1082, and an RLC (Radio Link Control) processing section 1083.

The layer 1 processing section 1081 performs a channel coding process, the FFT process and the like on the signal received in downlink.

Further, the layer 1 processing section 1081 performs the demodulation process and the decoding process on the Physical Downlink Control Channel (PDCCH) included in the signal received in downlink and transmits the demodulated and decoded result (signal) to the MAC processing section 1082. More specifically, the layer 1 processing section 1081 performs the demodulation process and the decoding process on the Downlink Scheduling Information, Uplink Scheduling Grant, and Acknowledgement Information (ACK/NACK) included in the Physical Downlink Control Channel (PDCCH) and transmits the demodulated and decoded result to the MAC processing section 1082, the Acknowledgement Information (ACK/NACK) being provided with respect to uplink shared channel.

To transmit the user data in uplink using the sub-frame, the layer 1 processing section 1081 first receives the user data from the MAC processing section 1082. Then, with respect to the received user data, the layer 1 processing section 1081 performs processes such as the coding process, a data modulation process, a DFT (Discrete Fourier Transformation) process, a sub-carrier mapping process, the IFFT process and the like, converts the processed user data into a baseband signal, and transmits to the transmission/receiving section 106 as the baseband signal.

The MAC processing section 1082 receives the Downlink Scheduling Information, the Uplink Scheduling Grant, and the Acknowledgement Information (ACK/NACK) that are demodulated and decoded by the layer 1 processing section 1081, the Acknowledgement Information (ACK/NACK) being provided with respect to uplink shared channel. According to an embodiment of the present invention, the user equipment (UE) terminal $100_n$ is mainly involved in transmitting the uplink shared channel; therefore, in the following, the transmission of the uplink shared channel is mainly described.

The MAC processing section 1082 determines the transmission format of the uplink user data based on the Uplink Scheduling Grant and performs transmission processes such as the retransmission control (HARQ) in the MAC layer. Namely, when the Uplink Scheduling Grant received by the layer 1 processing section 1081 specifies the communications using the uplink shared channel transmitted from the base station apparatus 200 to the user equipment (UE) terminal $100_n$, the MAC processing section 1082 determines the transmission format, performs transmission processes such as retransmission control (HARQ) with respect to the user data stored in a data buffer, and transmits the processed user data to the layer 1 processing section 1081.

In this case, when the Uplink Scheduling Grant does not specify the retransmission of the uplink shared channel transmitted before, the MAC processing section 1082 performs the transmission process for the new transmission (i.e., not retransmission) of the uplink shared channel. In this case, the MAC processing section 1082 may perform the transmission process for the new transmission regardless of what is indicated by the Acknowledgement Information (ACK/NACK) with respect to the uplink shared channel. More specifically, even when the Acknowledgement Information (ACK/NACK) indicates the "NACK" response, if the Uplink Scheduling Grant does not specify the retransmission of the uplink shared channel transmitted before, the MAC processing section 1082 may perform the transmission process for the new transmission.

On the other hand, when the Uplink Scheduling Grant specifies the retransmission of the uplink shared channel transmitted before, the MAC processing section 1082 performs the transmission process for the retransmission of the uplink shared channel transmitted before. In this case, when the retransmission timing specified by the uplink Scheduling Grant specifying the retransmission is different from the retransmission timing based on the applied Synchronous HARQ scheme, more specifically when the retransmission is specified by the Uplink Scheduling Grant but there are no data (uplink shared channel) to be retransmitted, the MAC processing section 1082 may ignore the data of the Uplink Scheduling Grant. In this case, the user equipment (UE) terminal $100_n$ does not transmit the uplink shared channel at the timing specified by the Uplink Scheduling Grant specifying the retransmission of the uplink shared channel. Further, the MAC processing section 1082 may perform the above process regardless of what is indicated in the Acknowledgement Information (ACK/NACK) with respect to the uplink shared channel. More specifically, in a case where the Acknowledgement Information (ACK/NACK) indicates the "ACK" response, if the Uplink Scheduling Grant specifies the retransmission of the uplink shared channel transmitted before, the MAC processing section 1082 may perform the transmission process for the retransmission of the uplink shared channel transmitted before.

In the above example, whether the Uplink Scheduling Grant specifies the retransmission of the uplink shared channel transmitted before is determined based on whether the value of the "bits indicating data size" is equal to the value (such as "111111") indicating that the Uplink Scheduling Grant specifies the retransmission of the uplink shared channel transmitted before. The method of setting the value of the "bits indicating data size" is similar to the method described with reference to FIGS. 2, 3, and 4.

Otherwise, as described with reference to FIG. 5, one bit in addition to the "bits indicating data size" may be provided in the Uplink Scheduling Grant so that the values of the bit indicate whether the Uplink Scheduling Grant specifies the retransmission of the uplink shared channel transmitted before. In this case, depending on the value of the bit, it is determined whether the Uplink Scheduling Grant specifies the retransmission of the uplink shared channel transmitted before.

In the downlink, the MAC processing section 1082 performs the reception process of the MAC retransmission control data of the downlink user data based on the Downlink Scheduling Information received from the layer 1 processing section 1081.

With respect to uplink, the RLC processing section 1083 performs the segmentation and concatenation process on the user data and the RLC-layer transmission processes such as the transmission process of the RLC (Radio Link Control) retransmission control data; and with respect to downlink, the RLC processing section 1083 performs the segmentation and concatenation process on the user data and the RLC-layer reception processes such as the reception process of the RLC retransmission control data.

Figure 10:
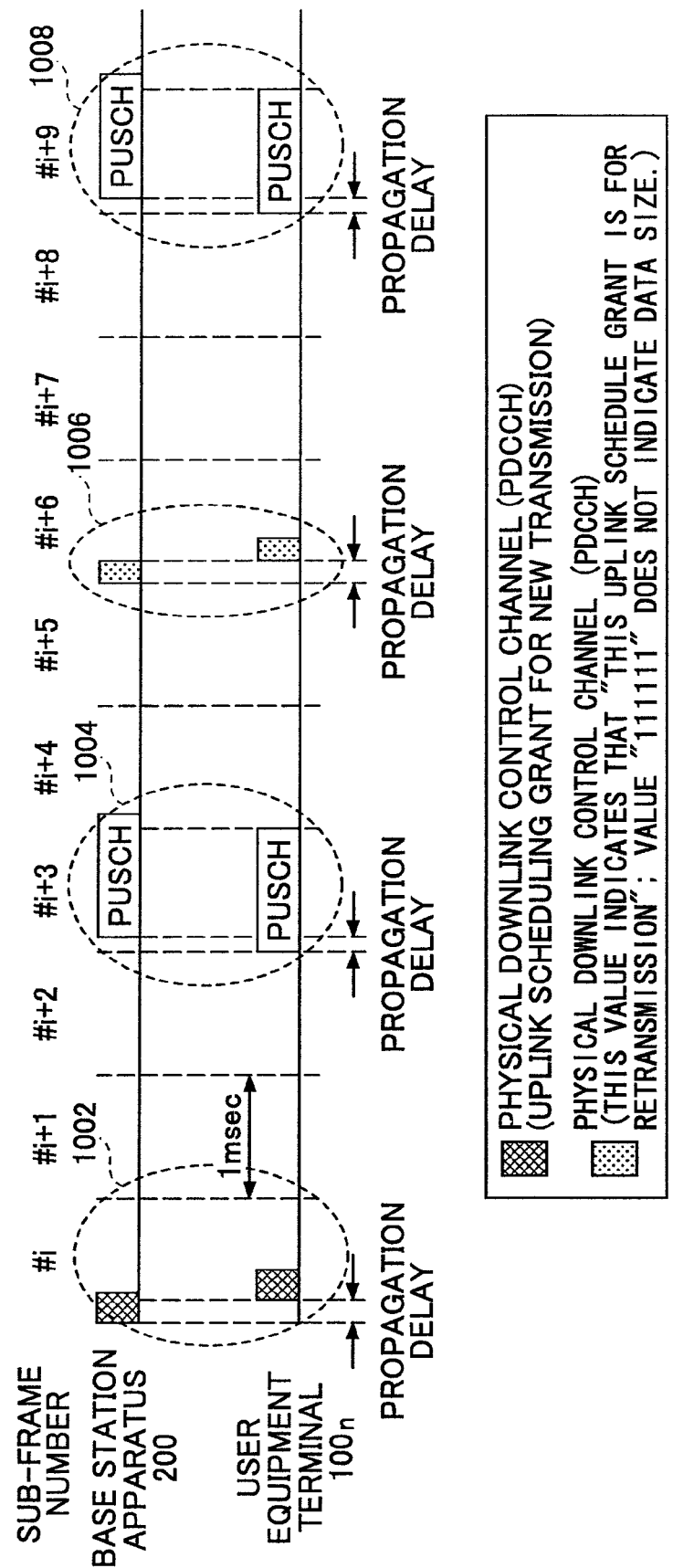
FIG. 10 is a drawing showing communications between the base station apparatus and the user equipment (UE) terminal.

FIG. 10 illustrates the processes performed made between the base station apparatus 200 and the user equipment (UE) terminal $100_n$ described in time domain. As shown in FIG. 10, for example, in sub-frame #i (in timing 1002), the base station apparatus 200 transmits the Uplink Scheduling Grant to the user equipment (UE) terminal $100_n$ using the Physical Downlink Control Channel (PDCCH), the Uplink Scheduling Grant including information items indicating the ID of a user (user equipment (UE) terminal) and the transport format information of the user data of the user, the user being scheduled to communicate with the base station apparatus 200 using the Physical Uplink Shared Channel (PUSCH) to be newly transmitted in sub-frame #i+3. In the same sub-frame #i (in timing 1002), the equipment (UE) terminal $100_n$ receives the Physical Downlink Control Channel (PDCCH) from the base station apparatus 200. Then, when the equipment (UE) terminal $100_n$ determines that the ID of the user who is scheduled to communicate with the base station apparatus 200 using the Physical Uplink Shared Channel (PUSCH) in sub-frame #i+3 is the same as the ID of the user equipment (UE) terminal $100_n$, the equipment (UE) terminal $100_n$ transmits the Physical Uplink Shared Channel (PUSCH) in sub-frame #i+3 (in timing 1004) based on the transport format information included in the Physical Downlink Control Channel (PDCCH). In timing 1004 (i.e., in sub-frame #i+3), the base station apparatus 200 receives the Physical Uplink Shared Channel (PUSCH) transmitted from the user equipment (UE) terminal $100_n$ specified by the base station apparatus 200 so as to communicate using the Physical Uplink Shared Channel (PUSCH) in sub-frame #i+3.

Next, a case is described where the base station apparatus 200 does not adequately receive the Physical Uplink Shared Channel (PUSCH) in sub-frame #i+3. Namely, in this case, it is assumed that a decoding result of the received Physical Uplink Shared Channel (PUSCH) is not good (NG). In this case, in sub-frame #i+6 (i.e., in timing 1006), the base station apparatus 200 transmits the Physical Downlink Control Channel (PDCCH) including the Uplink Scheduling Grant to the user equipment (UE) terminal $100_n$. This Uplink Scheduling Grant includes the ID of the user (user equipment (UE) terminal) and the transport information of the user data of the user, the user being scheduled to retransmit using the Physical Uplink Shared Channel (PUSCH) (called an Uplink Shared Channel (UL-SCH) as the transport channel) in sub-frame #i+9. As described above, the specific data (such as "111111") is set without fail as the value of the "bits indicating data size" in the Uplink Scheduling Grant, and the specific value ("111111" in this case) is not a value indicating the data size but a value indicating that the data packets to be transmitted next time are not new packet data but retransmission packet data. The method of setting the specific value of the "bits indicating data size" is the same as that described with reference to FIGS. 2, 3, and 4.

Otherwise, as described above with reference to FIG. 5, when one bit in addition to the "bits indicating data size" is provided in the Uplink Scheduling Grant so that the values of the bit indicate whether the Uplink Scheduling Grant specifies the retransmission of the uplink shared channel transmitted before, the value of the bit in the Uplink Scheduling Grant in the sub-frame #i+9 is set to "1" indicating that the uplink shared channel is to be retransmitted.

In sub-frame #i+6, in addition to the Uplink Scheduling Grant, the "NACK" response as the Acknowledgement Information (ACK/NACK) with respect to uplink shared channel may also be transmitted. In sub-frame #i+6 (i.e., in timing 1006), the user equipment (UE) terminal $100_n$ receives the Physical Downlink Control Channel (PDCCH). Namely, the user equipment (UE) terminal $100_n$ receives the Physical Downlink Control Channel (PDCCH) including the Uplink Scheduling Grant, the Uplink Scheduling Grant specifying the retransmission of the uplink shared channel in sub-frame #i+9, the uplink shared channel having been transmitted in sub-frame #i+3 before. Then, in sub-frame #i+9 (i.e., in timing 1008), the user equipment (UE) terminal $100_n$ retransmits the Physical Uplink Shared Channel (PUSCH) based on the transport format included in the Uplink Scheduling Grant.

In the example of FIG. 10, a case is described where a value of the Round Trip Time (RTT) of the HARQ is 6 ms. However, obviously, any value of the Round Trip Time (RTT) of the HARQ other than 6 ms, such as 8 ms or 10 ms, may also be applicable to the process described above.

FIG. 11 is a flowchart showing an operational process performed by the base station apparatus 200 according to an embodiment of the present invention. As shown in FIG. 11, in step S1102, the base station apparatus 200 determines the user equipment (UE) terminal that performs communications using the uplink shared channel in a predetermined subsequent sub-frame. Namely the base station apparatus 200 performs the Scheduling process selecting a user equipment (UE) terminal that performs the communication using the uplink shared channel in the predetermined subsequent sub-frame. Further, in a user equipment (UE) terminal, if the predetermined subsequent sub-frame corresponds to the timing when the Physical Uplink Shared Channel (PUSCH) to which the HARQ is applied is to be re-transmitted, the base station apparatus 200 may always select the user equipment terminal as the user equipment (UE) terminal that performs the communication using the uplink shared channel.

In this process, it is assumed that, in or before step S1102, the base station apparatus 200 has already determined whether the Physical Uplink Shared Channel (PUSCH) (called the Uplink Shared Channel (UL-SCH) as the transport channel) transmitted by the user equipment (UE) terminal to be selected in step S1102 is a channel to be re-transmitted (retransmission data). In step S1104, the base station apparatus 200 determines whether the result of the determination above is retransmission data. When determining that the Physical Uplink Shared Channel (PUSCH) is not to be retransmitted (retransmission data), the process goes to step S1106, where a value of the "bits indicating data size" is set. In step S1106, any information bits other than the "bits indicating data size" in the Uplink Scheduling Grant, such as the "bits indicating modulation scheme", the "bits indicating allocation information of resource blocks" or the "bits indicating information of transmission power" may be determined.

On the other hand, in step S1104, when determining that the Physical Uplink Shared Channel (PUSCH) is to be retransmitted (retransmission data), the process goes to step S1108, where a specific value (such as "111111") is set in the field of the "bits indicating data size". Unlike the values indicating data sizes, the specific value indicates that the data of the uplink transmission permitted in the predetermined subsequent sub-frame is the retransmission data. Namely when the uplink transmission is to be retransmitted, the specific data are set without fail in the field of the "bits indicating data size". After the process in step S1106 or step S1108, the base station apparatus 200 transmits the Physical Downlink Control Channel (PDCCH) including the Uplink Scheduling Grant to the user equipment (UE) terminal. In this case, as described above, the base station apparatus 200 may further transmit the Acknowledgement Information (ACK/NACK) as well as the Uplink Scheduling Grant. In the example of FIG. 11, a case is described where the "bits indicating data size" is used to indicate that the uplink transmission permitted is the retransmission data. However, alternatively, as described with reference to FIG. 5, one bit may be additionally provided to indicate that the uplink transmission permitted is the retransmission data. In this case, a value of the bit additionally provided is adequately set depending on whether the uplink transmission permitted is the retransmission data.

FIG. 12 is a flowchart showing an operational process performed by the user equipment (UE) terminal $100_n$ according to an embodiment of the present invention. As shown in FIG. 12, in step S1202, the user equipment (UE) terminal $100_n$ receives a Physical Downlink Control Channel (PDCCH) including the Uplink Scheduling Grant from the base station apparatus 200. The Uplink Scheduling Grant permits the signal to be transmitted using the uplink shared channel in the predetermined subsequent sub-frame.

Next, in step S1204, the value of the "bits indicating data size" in the Uplink Scheduling Grant is checked. As a result of the check, when determining that the value of the "bits indicating data size" is other than the specific value (such as "111111"), the process goes to step S1206. In step S1206, a new transmission signal not transmitted before is provided so as to be transmitted using permitted resources. On the other hand, in step S1204, when determining that the value of the "bits indicating data size" is the specific value (such as "111111"), the process goes to step S1208.

In step S1208, the transmission signal transmitted before is provided so as to be transmitted using permitted resources.

The transmission signal provided in step S1206 or step S1208 is transmitted or retransmitted, respectively, to the base station apparatus 200 in the predetermined sub-frame.

Further, in step S1208, when the predetermined subsequent sub-frame at which the uplink transmission is permitted does not correspond to the timing when the Physical Uplink Shared Channel (PUSCH) to which the HARQ is applied is to be re-transmitted, the user equipment (UE) terminal $100_n$ may ignore the Uplink Scheduling Grant so that the user equipment (UE) terminal $100_n$ performs a process of not transmitting an uplink shared channel even in the predetermined subsequent sub-frame. More specifically, in a case where the predetermined subsequent sub-frame at which the uplink transmission is permitted corresponds to the timing when the Physical Uplink Shared Channel (PUSCH) to which the HARQ is applied is to be re-transmitted, when the specific value (such as "111111") is set in the field of the "bits indicating data size", the user equipment (UE) terminal $100_n$ may perform a process of retransmitting the signal transmitted before to the base station apparatus 200 in the sub-frame.

In the example of FIG. 12, a case is described where the "bits indicating data size" is used to indicate that the data of the uplink transmission permitted is the retransmission data. However, alternatively, as described with reference to FIG. 5, one bit may be additionally provided to indicate that the data of the uplink transmission permitted is the retransmission data. In this case, in step S1204, by checking the value of the bit additionally provided, it is determined whether the data of the uplink transmission permitted is the retransmission data.

As described above, the user equipment (UE) terminal may receive not only the Uplink Scheduling Grant but also the Acknowledgement Information (ACK/NACK). In this case, whether retransmission is required may be determined based on either the received response ("ACK" or "NACK") of the Acknowledgement Information or the information (i.e., the value of "bits indicating data size" or the value of bit additionally provided) included in the Uplink Scheduling Grant. Ideally, both the received response ("ACK" or "NACK") of the Acknowledgement Information and the information included in the Uplink Scheduling Grant should indicate the same results; however, due to the radio propagation environment, the received response ("ACK" or "NACK") of the Acknowledgement Information and the information included in the Uplink Scheduling Grant may provide inconsistent (different) results. In this case, for example, the result of whether retransmission is required determined based on the Uplink Scheduling Grant may be preferentially used. Further, when both of the Uplink Scheduling Grant and the Acknowledgement Information (ACK/NACK) are transmitted, whether retransmission is to be performed may be determined (controlled) only based on the information included in the Uplink Scheduling Grant regardless of the received response ("ACK" or "NACK") of the Acknowledgement Information. More specifically, in this case, regardless of the received response ("ACK" or "NACK") of the Acknowledgement Information, when the Uplink Scheduling Grant specifies (indicates) the retransmission, it may be determined that the retransmission is to be performed, and when the Uplink Scheduling Grant specifies (indicates) the new transmission (initial transmission), it may be determined that the new (initial) transmission is to be performed. The reason of the determination is that the CRC (Cyclic Redundancy Check) bits are added to the information of the Uplink Scheduling Grant as error detection codes, which makes the Uplink Scheduling Grant more reliable than the Acknowledgement Information to which no CRC bit is attached. However, it does not mean that whether the retransmission is required should not be based on the received response ("ACK" or "NACK") of the Acknowledgement Information.

In the above embodiment, a case is described where both the Acknowledgement Information (ACK/NACK) and the Uplink Scheduling Grant are transmitted. However, a base station apparatus, a user equipment (UE) terminal, and a method according to an embodiment of the present invention may also be applied to a case where no Acknowledgement Information (ACK/NACK) is transmitted and only the Uplink Scheduling Grant is transmitted. In this case, upon correctly receiving the uplink shared channel, the base station terminal 200 may not transmit the Uplink Scheduling Grant; and only when the base station terminal 200 incorrectly receiving the uplink shared channel, the base station terminal 200 may transmit the Uplink Scheduling Grant for the retransmission at a predetermined timing to the user equipment (UE) terminal 100$_n$. On the other hand, when the Uplink Scheduling Grant for the retransmission is not transmitted at the timing when the Uplink Scheduling Grant for the retransmission is to be transmitted, the user equipment (UE) terminal 100$_n$ may determine that the uplink shared channel transmitted before has been correctly received by the base station apparatus 200; and when the Uplink Scheduling Grant for the retransmission is transmitted at the timing when the Uplink Scheduling Grant for the retransmission is to be transmitted, the user equipment (UE) terminal 100$_n$ may retransmit the uplink shared channel transmitted before.

In the above embodiment, an example is described where a base station apparatus, a user equipment (UE) terminal, and a method according to an embodiment of the present invention are applied to an Evolved UTRA and UTRAN (a.k.a a Long Term Evolution or a Super 3G) system. However, the base station apparatus, the user equipment (UE) terminal, and the method according to an embodiment of the present invention may also be applicable to a system as long as communications are made by using a shared channel in the system.

The present invention is described above by referring to a specific embodiment. However, a person skilled in the art may understand that the above embodiments are described for illustrative purposes only and may think of examples of various modifications, transformations, alterations, changes, and the like. To promote an understanding of the present invention, the specific values are used as examples throughout the description. However, it should be noted that such specific values are just sample values unless otherwise described, and any other values may be used. For illustrative purposes, the apparatus according to an embodiment of the present invention is described with reference to the functional block diagram. However, such an apparatus may be provided by hardware, software, or a combination thereof. The present invention is not limited to the embodiment described above, and various modifications, transformations, alteration, exchanges, and the like may be made without departing from the scope and spirit from the present invention.

The present application is based on and claims the benefit of priority of Japanese Patent Application No. 2007-071588, filed on Mar. 19, 2007, the entire contents of which are hereby incorporated herein by reference.

The invention claimed is:

1. A user equipment terminal communicating with a base station apparatus in a mobile communication system, comprising:
   a control information receiving unit configured to receive control information and error detection codes of the control information, the control information specifying a resource for an uplink signal and permitting new transmission or retransmission of an uplink signal;
   a transmission unit configured to transmit the uplink signal using the resources specified by the control information; and
   an acknowledgement information receiving unit configured to receive acknowledgement information indicating whether an uplink signal transmitted before is to be retransmitted, wherein
   upon receiving both the control information and the acknowledgement information in a sub-frame, the user equipment terminal transmits a new uplink signal or retransmits the uplink signal based on the control information regardless of what the acknowledgement information indicates.

2. The user equipment terminal according to claim 1, wherein
   upon receiving both the control information and the acknowledgement information indicating that the uplink signal transmitted before is not required to be retransmitted, the user equipment terminal transmits an uplink signal which is to be retransmitted or which is not a retransmitted signal based on the control signal regardless of what the acknowledgement information indicates.

3. The user equipment terminal according to claim 1, wherein
   upon receiving both the control information and the acknowledgement information indicating that the uplink signal transmitted before is required to be retransmitted, the user equipment terminal transmits an uplink signal which is to be retransmitted or which is not a retransmitted signal based on the control signal regardless of what the acknowledgement information indicates.

4. The user equipment terminal according to claim 1, wherein the control information specifies a sub-frame as the resource for the uplink signal, the sub-frame being a predetermined number of sub-frames after a sub-frame in which the control information is received, and the acknowledgement information indicates whether it is necessary to retransmit in a sub-frame which is another predetermined sub-frames after a sub-frame in which the acknowledgement information is received.

5. The user equipment terminal according to claim 2, wherein the control information specifies a sub-frame as the resource for the uplink signal, the sub-frame being a predetermined number of sub-frames after a sub-frame in which the control information is received, and the acknowledgement information indicates whether it is necessary to retransmit in a sub-frame which is another predetermined sub-frames after a sub-frame in which the acknowledgement information is received.

6. The user equipment terminal according to claim 3, wherein the control information specifies a sub-frame as the resource for the uplink signal, the sub-frame being a predetermined number of sub-frames after a sub-frame in which the control information is received, and the acknowledgement information indicates whether it is necessary to retransmit in a sub-frame which is another predetermined sub-frames after a sub-frame in which the acknowledgement information is received.

* * * * *